(12) United States Patent
Bahr et al.

(10) Patent No.: US 11,353,404 B2
(45) Date of Patent: Jun. 7, 2022

(54) ANTI-MICROBIAL TREATMENT FOR HARDENED METALLIC SURFACES

(71) Applicant: Purdue Research Foundation, West Lafayette, IN (US)

(72) Inventors: David F. Bahr, West Lafayette, IN (US); Jesus Hector Morales Espejo, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 16/106,063

(22) Filed: Aug. 21, 2018

(65) Prior Publication Data

US 2021/0101227 A1 Apr. 8, 2021

Related U.S. Application Data

(60) Provisional application No. 62/548,660, filed on Aug. 22, 2017.

(51) Int. Cl.
| | | |
|---|---|---|
| *G01N 21/78* | (2006.01) | |
| *C22C 14/00* | (2006.01) | |
| *B23K 26/03* | (2006.01) | |
| *C23C 8/80* | (2006.01) | |
| *B23K 26/0622* | (2014.01) | |

(52) U.S. Cl.
CPC .......... *G01N 21/78* (2013.01); *B23K 26/034* (2013.01); *C22C 14/00* (2013.01); *C23C 8/80* (2013.01); *B23K 26/0622* (2015.10); *C22C 2202/00* (2013.01)

(58) Field of Classification Search
CPC .. B23K 26/0622; B23K 26/034; C22C 14/00; C22C 2202/00; G01N 21/78; C23C 8/80; C22F 1/183
See application file for complete search history.

(56) References Cited

U.S. PATENT DOCUMENTS

| | | | | |
|---|---|---|---|---|
| 2006/0172013 A1* | 8/2006 | Hirai | ................... | C04B 41/5007 424/630 |
| 2007/0275264 A1* | 11/2007 | Hultin | ..................... | C23C 30/00 428/687 |
| 2012/0144680 A1* | 6/2012 | Scillia | ................ | B23K 26/0846 30/350 |

FOREIGN PATENT DOCUMENTS

| | | | | |
|---|---|---|---|---|
| EP | 0466244 A1 * | 1/1992 | ..... | C12Y 302/01017 |
| JP | 2008080113 A * | 4/2008 | | |

OTHER PUBLICATIONS

Laakso, Marking Decorative Features to Stainless Steel with Fiber Laser, 2008, IMD/ALAC, p. 1-7 (Year: 2008).*
Espejo, Nisin infusion into surface cracks in oxide coatings to create an antibacterial metallic surface, 2019, Materials Science and Engineering: C, 105, p. 1-7 (Year: 2019).*

* cited by examiner

*Primary Examiner* — Christopher S Kessler
*Assistant Examiner* — Andrew M Cheung
(74) *Attorney, Agent, or Firm* — Purdue Research Foundation; Liang Zeng Yan

(57) ABSTRACT

A simple and practical antibacterial treatment with nisin in cracked or uncracked metal tools is provided and easily monitored for its bacteriocin effect.

9 Claims, 19 Drawing Sheets

| Scan rate (mm/s) | 90 | 110 | 170 | 200 | 300 |
|---|---|---|---|---|---|
| Thickness (nm) | 148 | 139 | 124 | 119 | 110 |

- Non-stoichiometric oxides, TiO and $Ti_6O$
- Oxide layer (film) varies in thickness, changing color
- Higher scan rate → Lower thickness

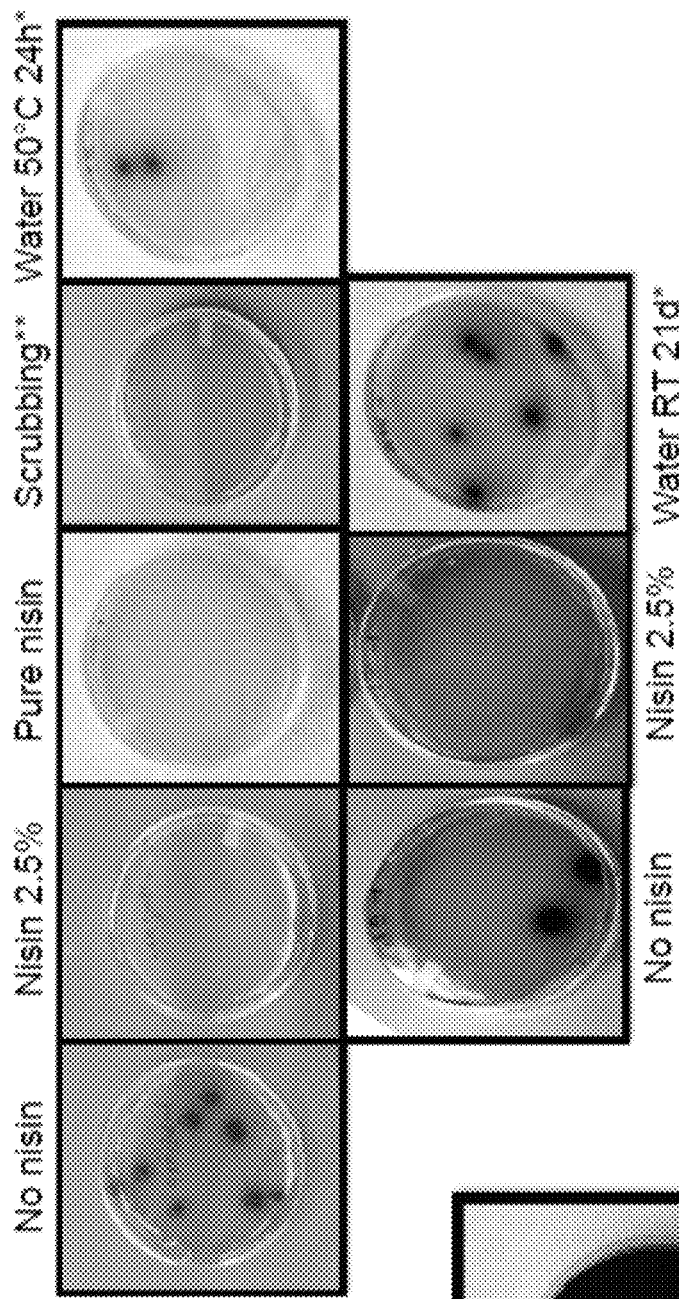
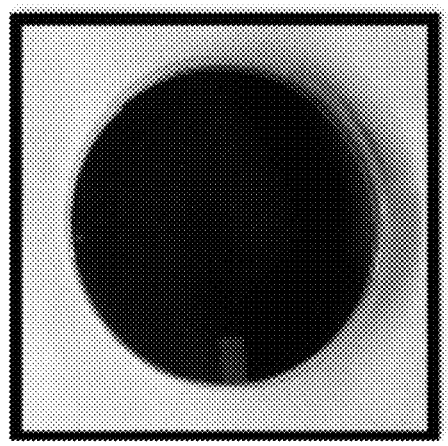
FIG. 17A
FIG. 17B

ANTI-MICROBIAL TREATMENT FOR HARDENED METALLIC SURFACES

FIELD OF INVENTION

This disclosure relates to an anti-microbial treatment for hardened metallic surfaces.

Specifically, microscopic cracks created by pulsed laser irradiation at different scan rates are introduced to the surface of Ti6AI4V or stainless steel and accommodate antibacterial peptides (AMP). Such modified hardened metallic surface can be used for various applications including food processing and sterilization.

BACKGROUND

Crack formation drives material failure and is often regarded as a process to be avoided [1] and a menace for the microfabrication industry [2]. Such cracking can happen over a wide range of length scales—from the macroscopic, like geological and biological systems, to the microscopic, like cracking thin films for a particular technology [3].

Arresting crack propagation is important for the prevention of material failure, however, in specific cases, cracks may find useful applications such as in cryptography. The tailoring of controlled cracks can find use in engineered structures as well. If the stress drops during the propagation of a crack, the crack registers the disturbance of the driving force and, when this one decreases to a value comparable to the crack resistance, the crack stops propagating [1].

Metallic titanium, in contact with the atmosphere, develops a passive oxide film, (generally 2-3 nm thickness [4]), which gives titanium its excellent corrosion resistance [5]. Thicker titanium oxide coatings attract particular interest in applications such as optical and decorative coatings, catalysts and medical implants. A good technique to produce such coatings is pulsed laser irradiation of a metallic titanium surface in a reactive (oxidizing) atmosphere [6, 7].

In order to produce colored oxide films on titanium through laser irradiation, the pulse must heat the surface to an elevated temperature within a certain time needed for chemical reactions to take place [6]. Nevertheless, when the laser pulse stops, the material cools down and, due to the difference in coefficients of thermal expansion between the metallic substrate and the film (oxide), the latter is often susceptible to through thickness fracture (cracking) from high residual stresses [4, 8]. These residual stresses are in-plane tensile stresses if the coefficient of thermal expansion of the film exceeds that of the substrate ($\alpha_f > \alpha_s$) [9]. Sometimes the cracking phenomenon is not limited only to the film. Film debonding or decohesion may accompany the channeling crack if the interface fracture toughness ($\Gamma_i$) is sufficiently low compared to that of the film and substrate.

Cracking may also extend into the substrate. If the substrate is very stiff compared to the film, the channeling crack may not reach the interface with the substrate. Conversely, depending on the elastic mismatch and the toughness of the substrate relative to the film, the crack may penetrate into the substrate [9]. It has also been demonstrated that a brittle film may cause a premature fracture of a ductile substrate and that crack penetration depends on the number of dislocations emitted from the crack tip [10]. Each of these effects can influence film crack interaction and the paths that cracks follow. There are cases, for example, in which a propagating film crack induces an interface debond on one side of the crack but not on the other, creating a strong asymmetry with respect to the crack tip, causing the crack to follow a curved trajectory [9].

Oxides fabricated by pulsed laser irradiation on a commercial titanium alloy substrate can be characterized using electron microscopy to determine the geometry and depth of the cracks. It is of interest what beneficial use of these cracks in metal surface can be introduced.

Nisin is a polycyclic antibacterial peptide produced by the bacterium *Lactococcus lactis* that is used as a food preservative. It has 34 amino acid residues, including the uncommon amino acids lanthionine (Lan), methyllanthionine (MeLan), didehydroalanine (Dha), and didehydroaminobutyric acid (Dhb). These unusual amino acids are introduced by posttranslational modification of the precursor peptide. In these reactions a ribosomally synthesized 57-mer is converted to the final peptide. The unsaturated amino acids originate from serine and threonine, and the enzyme-catalysed addition of cysteine residues to the didehydro amino acids result in the multiple (5) thioether bridges. Subtilin and epidermin are related to nisin. All are members of a class of molecules known as lantibiotics.

In the food industry, nisin is obtained from the culturing of *L. lactis* on natural substrates, such as milk or dextrose, and it is not chemically synthesized.

It was originally isolated in the late 1930s, and produced since the 1950s as Nisaplin from naturally occurring sources by Aplin and Barrett in laboratories in Beaminster in Dorset, and approved as an additive for food use in the USA in the late 1960s.

While in general most bacteriocins inhibit only closely related species, nisin is a rare example of a "broad-spectrum" bacteriocin effective against many Gram-positive organisms, including lactic acid bacteria (commonly associated with spoilage), *Listeria monocytogenes* (a known pathogen), *Staphylococcus aureus, Bacillus cereus, Clostridium botulinum*, etc. It is also particularly effective against spores. Gram-negative bacteria are protected by their outer membrane but may become susceptible to nisin action after a heat shock or when this is coupled with the chelator EDTA. Nisin is soluble in water and can be effective at levels nearing the parts-per-billion range. Nisin concentration can be measured using various techniques such as chromatography or by a simple agar diffusion bioassay.

Commercially nisin is composed by 77.5% NaCl, 20% proteins/carbohydrates, only 2.5% nisin. Nisin is used in processed cheese, meats, beverages, etc. during production to extend shelf life by suppressing Gram-positive spoilage and pathogenic bacteria. In foods, it is common to use nisin at levels ranging from ~1-25 ppm, depending on the food type and regulatory approval.

SUMMARY OF THE INVENTION

This disclosure provides an anti-microbial wear resistant coating to metal surface, which can help food processors to monitor and verify the existence of such treatment by simple optical method.

In one embodiment, the disclosure provides an antibacterial metal surface modified by pulse laser irradiation (PLI) comprising an artificial oxide layer treated with effective amount of nisin.

In some embodiment the aforementioned artificial oxide layer vary in thickness and displays different colors due to interaction with visible light.

In some embodiment the aforementioned metal is Ti6AI4V.

In some embodiment the aforementioned metal is stainless steel.

In some embodiment the aforementioned antibacterial metal surface is a food processing knife, cutting board, packaging utensil, or surgical scalpel.

This disclosure further provides method of using aforementioned antibacterial metal surfaces to food processing industry or medicinal practice.

This disclosure provides a method to monitor an antibacterial material presence in a PLI modified metal surface. The method comprises observing the color changes according to the optical spectrum of a defined crack pattern and detecting the antibacterial material by conventional means, for example, by FTIR.

This disclosure further provides a method of providing antibacterial function to a metal surface tool. The method comprises modifying the metal surface tool with pulse laser irradiation to create an artificial oxide layer; saturating the artificial oxide layer with effective amount of nisin; and optionally wash or scrub the artificial oxide layer to remove extra nisin.

In some embodiment the aforementioned metal surface tool is monitored to detect chronological release of nisin in the surrounding environment.

In some embodiment the aforementioned artificial oxide layer is monitored by optical spectrum in a defined crack pattern.

These and other features, aspects and advantages of the present invention will become better understood with reference to the following figures, associated descriptions and claims.

BRIEF DESCRIPTION OF THE DRAWINGS

FIGS. 1A-1B depict backscattered electron images of the oxide film formed after PLI wherein FIG. 1A shows at 110 mm/s and FIG. 1B shows at 300 mm/s. Lines in the background, parallel to the arrows in the figures, are the result of the scanning direction of the laser path. There is no clear relationship between the laser direction and the formation of cracks.

FIGS. 2A-2B depict FIB images of cross sections, wherein FIG. 2A shows the crack grows perpendicular to the interface but with some wobbling, probably due to the alternate expansion/contraction cycles between each laser pulse and the next and FIG. 2B shows the presence of a branch coming from the main crack.

FIG. 14A shows that at close of neutrality (pH 6) the release of nisin is low and nisin keeps releasing even after 21 days. FIG. 14B shows that under acidic conditions (pH 2) the nisin release rate accelerates substantially. When pH 2 is combined with a rise in temperature, nisin release is estimated to be 100 times faster compared to normal conditions (pH 6 and room temperature).

FIGS. 17A-17B show that Nisin is effective on oxide layers. Under different treatments following the flow chart of FIG. 16, the amount of bacterial colonies on the petri dishes is kept low. FIG. 17A shows a petri dish with normal bacteria growth. FIG. 17B, the top shows bacteria growth pattern under different concentrations of nisin treatment to Titanium; while the bottom shows bacteria growth pattern under different concentrations of nisin treatment to stainless steel. It is confirmed that nisin on oxide layers of these metal has bacteriocin effect, while nisin coated on Titanium does not get released even after scrubbing and raised temperature, nisin coated on stainless steel is able to release at room temperature even after 21 days.

TABLE I

Chemical composition of the Ti alloy, obtained by EDS.

| | % Ti | % Al | % V | % Others |
|---|---|---|---|---|
| Ti-6Al-4V | 89.4 | 7.4 | 3.1 | <0.1 |

TABLE II

Applied laser scan rates with resulting film thickness and color variation of the coupons. Irradiated area (colored centered square) is 6 × 6 mm.

| Laser scan rate (m/s) | 90 | 110 | 170 | 200 | 300 |
|---|---|---|---|---|---|
| Film thickness, h (nm) | 148 | 139 | 124 | 119 | 110 |

TABLE III

Crack density and crack spacing obtained by laser scanning at different rates.

| Laser scan rate (mm/s) | 90 | 110 | 170 | 200 | 300 |
|---|---|---|---|---|---|
| Crack density, C. (cracks/mm) | 74.5 | 78.8 | 126.0 | 126.6 | 150.0 |
| Average Crack spacing, S (μm) | 13.4 | 12.7 | 7.9 | 7.9 | 6.6 |

TABLE IV

Mechanical properties for film and substrate

| | Film | Substrate |
|---|---|---|
| Young's modulus, E (GPa) | 215 [4] | 110 [14] |
| Poisson's ratio, ν | 0.3 | 0.3 |
| Shear modulus, μ (GPa) | 90 | 44 |
| Residual stress, $\sigma_0$ (GPa) | 6.7-10.3 [4] | — |

DETAILED DESCRIPTION

While the concepts of the present disclosure are illustrated and described in detail in the figures and the description herein, results in the figures and their description are to be considered as exemplary and not restrictive in character; it being understood that only the illustrative embodiments are shown and described and that all changes and modifications that come within the spirit of the disclosure are desired to be protected.

Unless defined otherwise, the scientific and technology nomenclatures have the same meaning as commonly understood by a person in the ordinary skill in the art pertaining to this disclosure.

Pulsed laser irradiation (PLI) at different scan rates was used to modify the surface of Ti6Al4V, creating an artificial oxide layer under atmospheric conditions. Analysis of cross sections of samples by focused ion beam revealed that the oxide layers vary in thickness, displaying different colors due to interaction with visible light.

Previous studies have shown the immobilization of antimicrobial peptides (AMP) as a way to confer antibacterial properties to other materials which are prone to biofilm formation; however, subsequent release of AMP from the surface may also contribute to inhibit bacteria in the surrounding medium.

In this disclosure, antibacterial tests demonstrate that Ti6Al4V modified surfaces by PLI and treated with AMP inhibit the growth of *Listeria monocytogenes*. The response of the surface to mechanical impacts and different environmental conditions (dry, humid, wet, etc.) was evaluated, as well as measurements of the peptide released from the surface.

Figure 5:
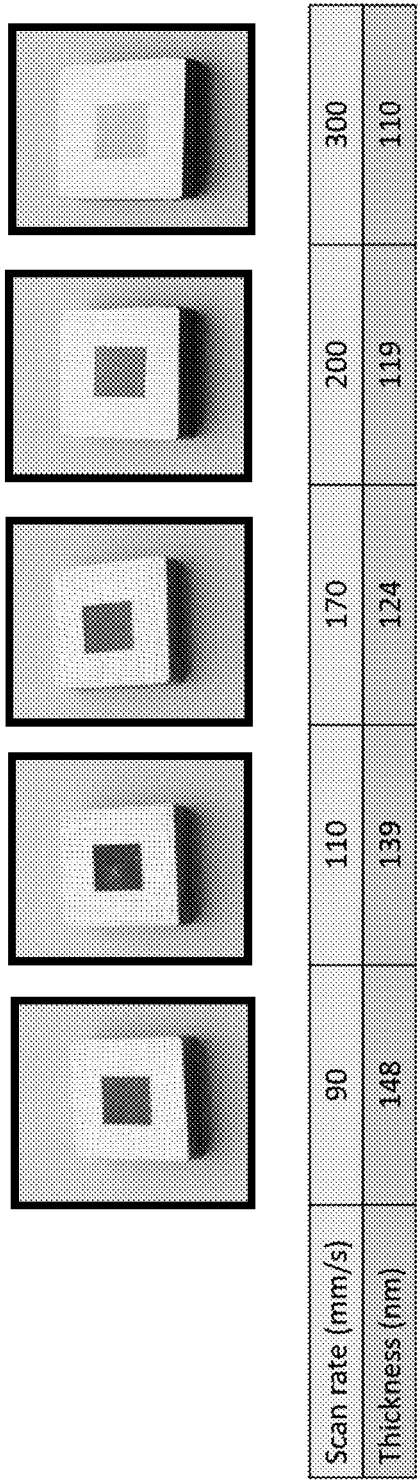
FIG. 5 shows optical variation of oxide layer.
Figure 6:
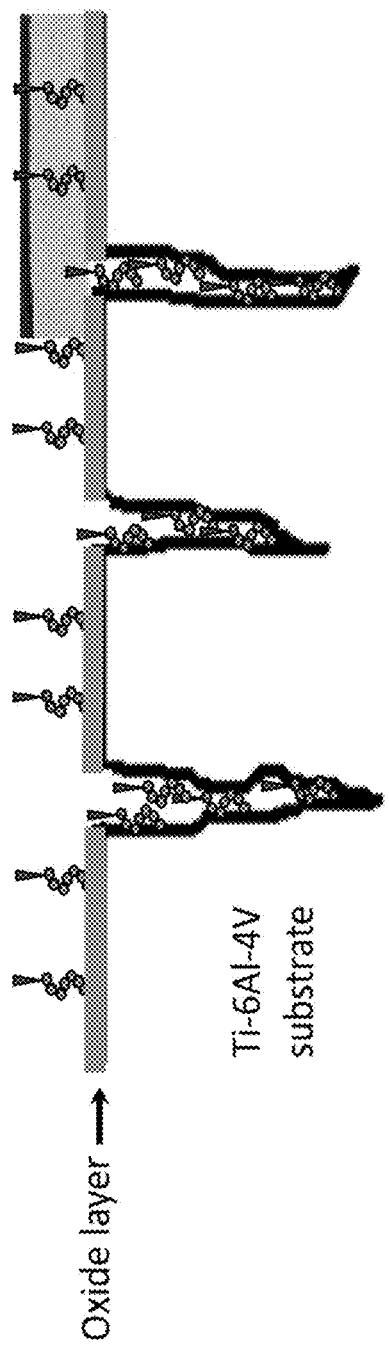
FIG. 6 shows the benefit from the cracks, using cracks to be possible reservoir for storing other materials.

Briefly, prevention of biofilm formation in a metal surface has practical applications, including in food processing and medicinal apparatus sterilization. In this disclosure, pulsed laser irradiation is employed to facilitate Ti oxide growth on a metal surface, forming various cracks to accommodate storage of different materials. A non-limiting list of materials that can be stored in the cracks are lubricants, anti-corrosive compounds, adhesives and antimicrobials, as seen in FIG. 6. In addition, depending on the type of laser used, frequency of the laser, pulse duration (time, ns), number of pulses, scan rate and working atmosphere, the microstructure, thickness and color of the film will be affected. For example, FIG. 5 shows optical variation of oxide layer in relation to the laser scan rate and thickness of the film. Such unique feature of metal surface cracks and its ability to be responsive to different light provides a convenient reservoir to harbor useful material and being monitored/replenished as needed.

Figure 7:
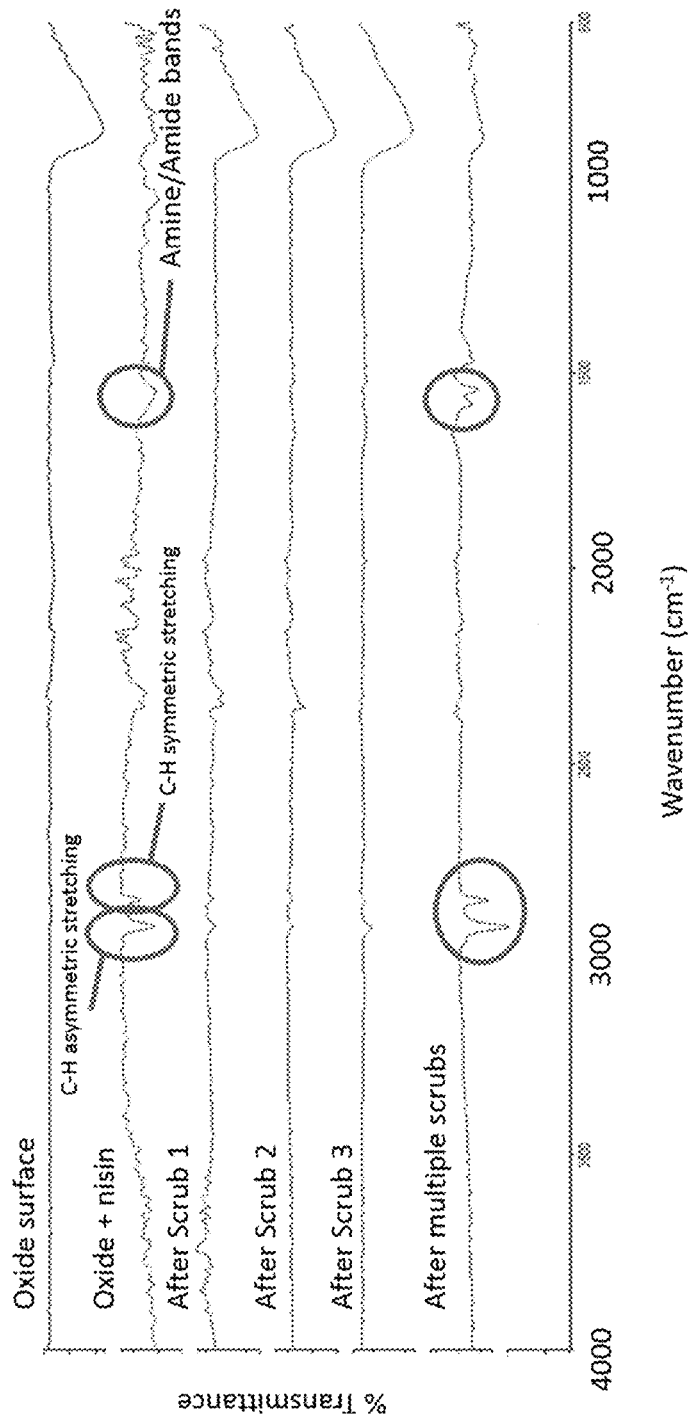
FIG. 7 depicts that FTIR identifies peptides before and after mechanical impacts.
Figure 8:
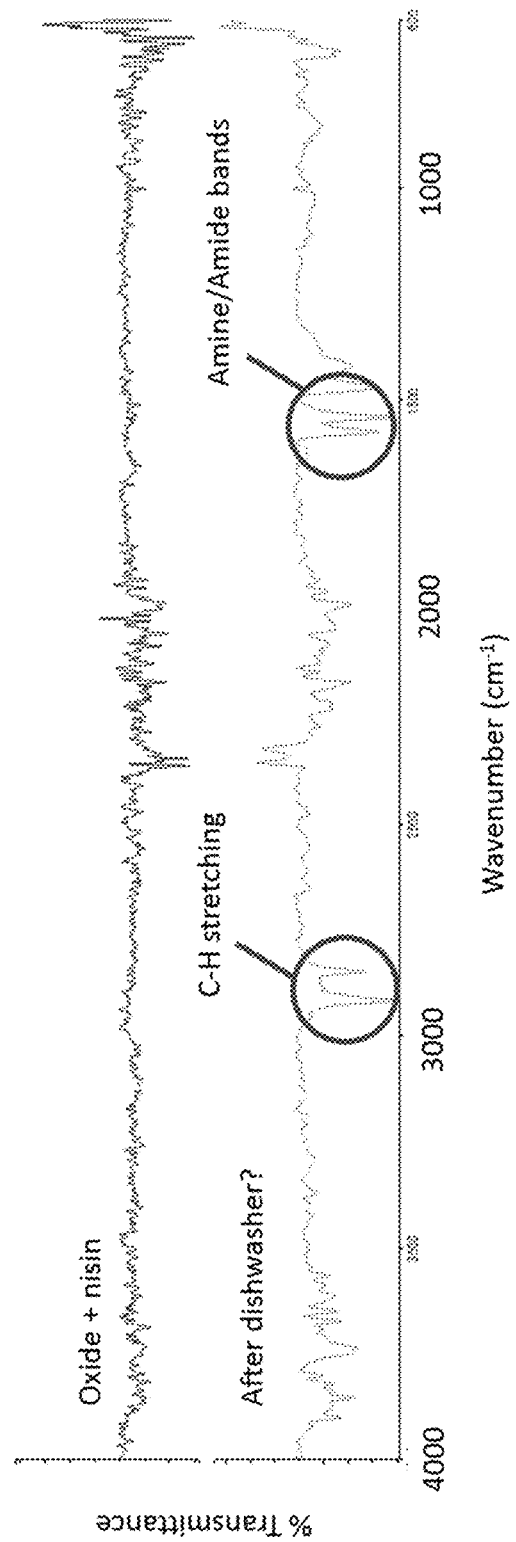
FIG. 8 shows the peptides resistance to washing (water+detergent)+temperature.
Figure 9:
FIG. 9 demonstrates that antibacterial test shows effect of nisin treatment: the right side plate is nisin treated while the left side plate is not.
Figure 10:
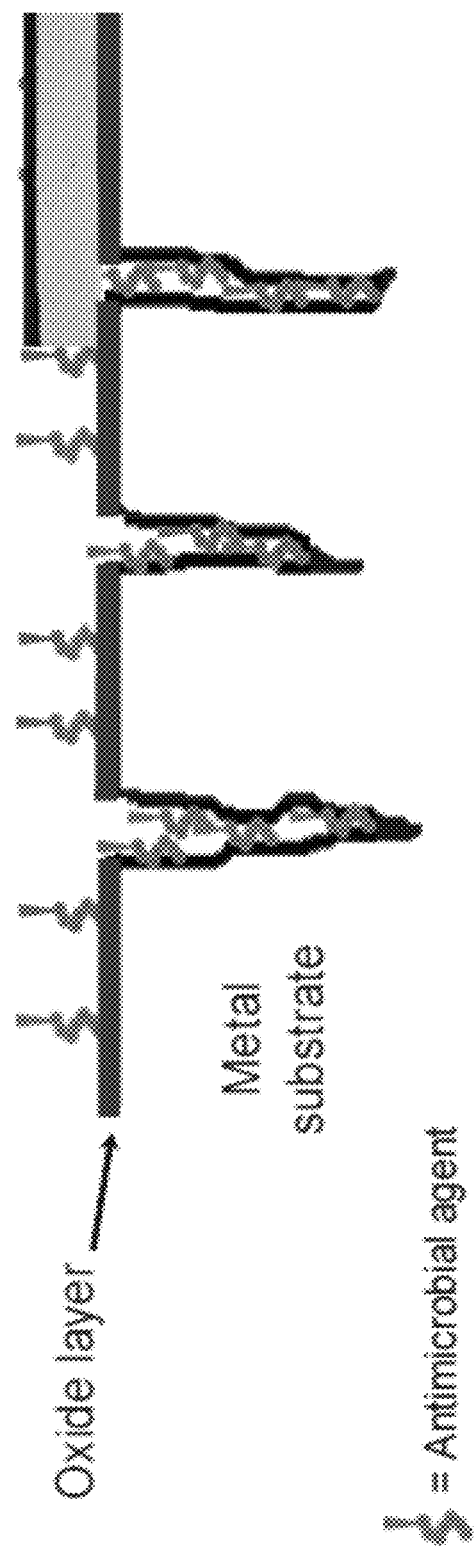
FIG. 10 shows diagram of oxidation and bonding method to store nisin in oxide microcracks on a metallic surface, with the purpose to reduce pathogenic bacteria which can transfer to food products (meats, vegetables, diary, etc.)
Figure 11:
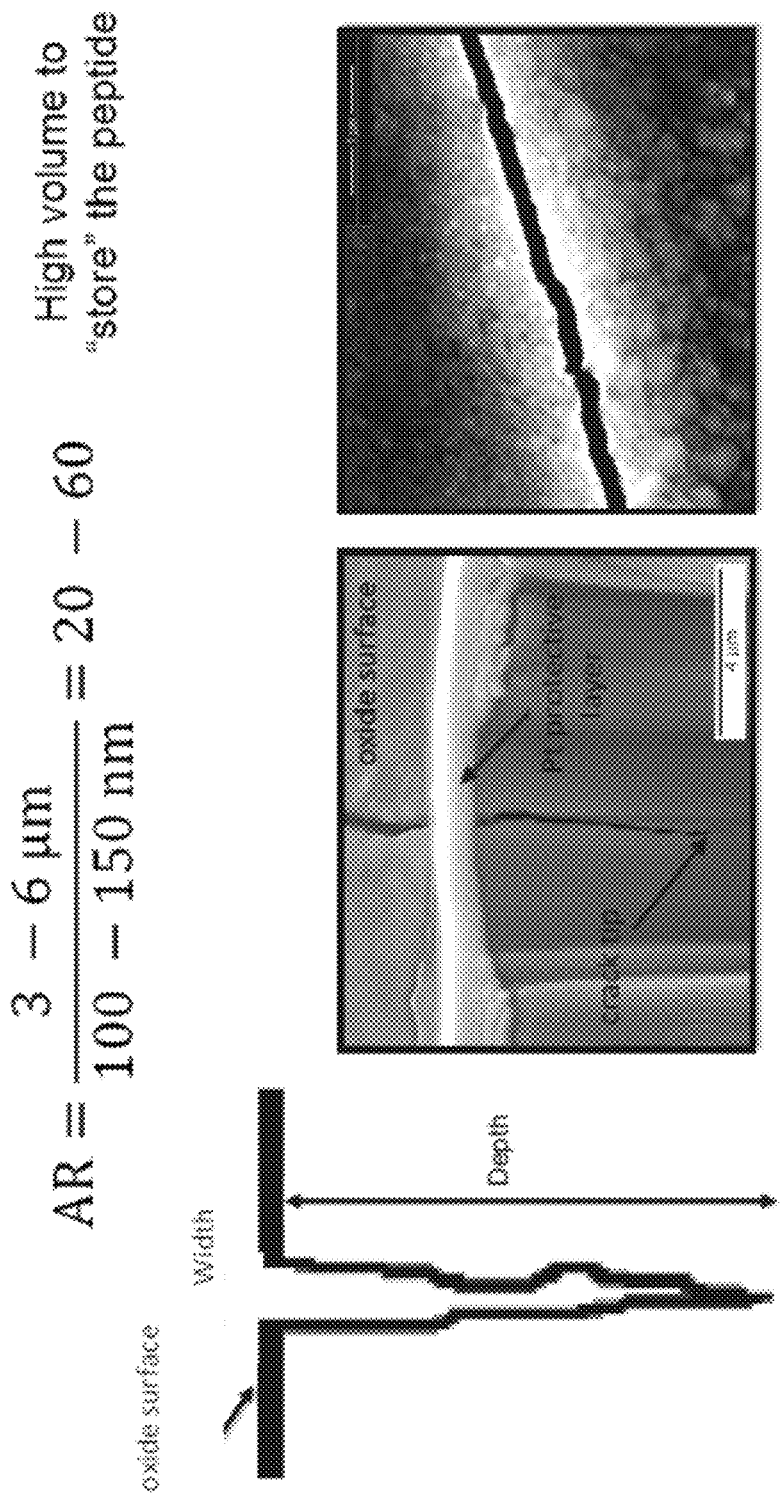
FIG. 11 shows diagram of showing Aspect ratio of cracks. Even a small crack has a high volume to store the peptide in the crack.

In one un-limiting example, nisin, an antibacterial peptide produced by *Lactococcus lactis* and active against a wide range of Gram-positive bacteria, is widely used as a food preservative approved by FDA and can be stored in the reservoirs for different uses in metal surface cracks. Nisin can be infused into metal surface cracks through an oxide film and vacuumed the solution. Through various methods such as FTIR a person skilled in the art is able to identify the peptides stored in the cracks even after some mechanical impact, such as scrubbing the surface or washing by water and detergent. See FIGS. 7 and 8. It is desirable to find out if those amine/amide groups correspond to nisin and if this organic material is coming out from the cracks.

In one of antibacterial tests, the film on metal surface with or without nisin treatment is immersed into a Brain-heart infusion (BHI) medium with bacteria *Listeria monocytogenes*. After cleaning the surface with cotton swab, the solution is diluted and inoculated to petri dishes to observe bacteria growth. For non nisin-treated samples, at least 9 colony forming units were observed, whereas the nisin treated solution does not form colony forming unit, indicating nisin stored in the metal surface cracks still exerts its antibacterial effects.

Figure 15:
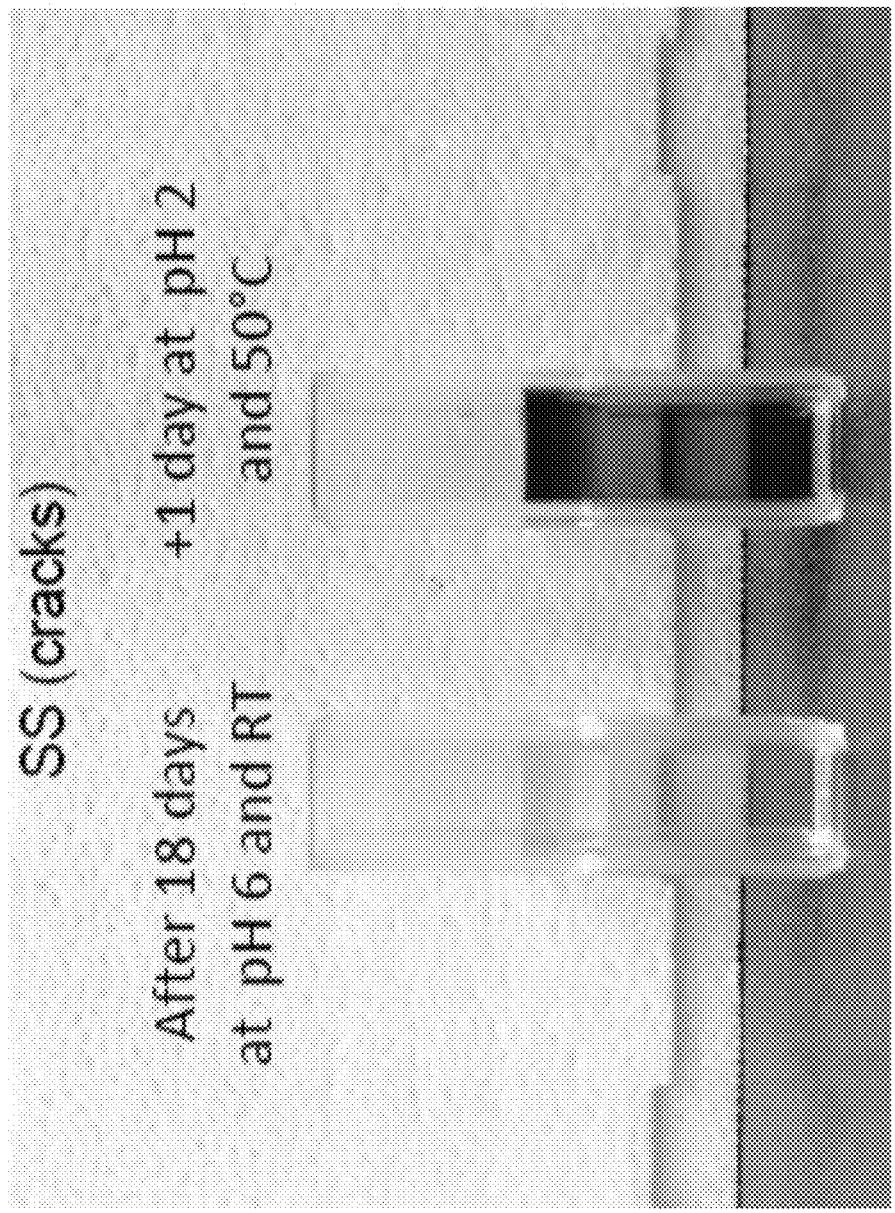
FIG. 15 shows a stainless steel specimen release of nisin under different conditions. A stainless steel with crack is put at room temperature and pH 6 the release is not detected even after 18 days; whereas at pH 2 and 50° C. nisin release is observed within one day.
Figure 16:
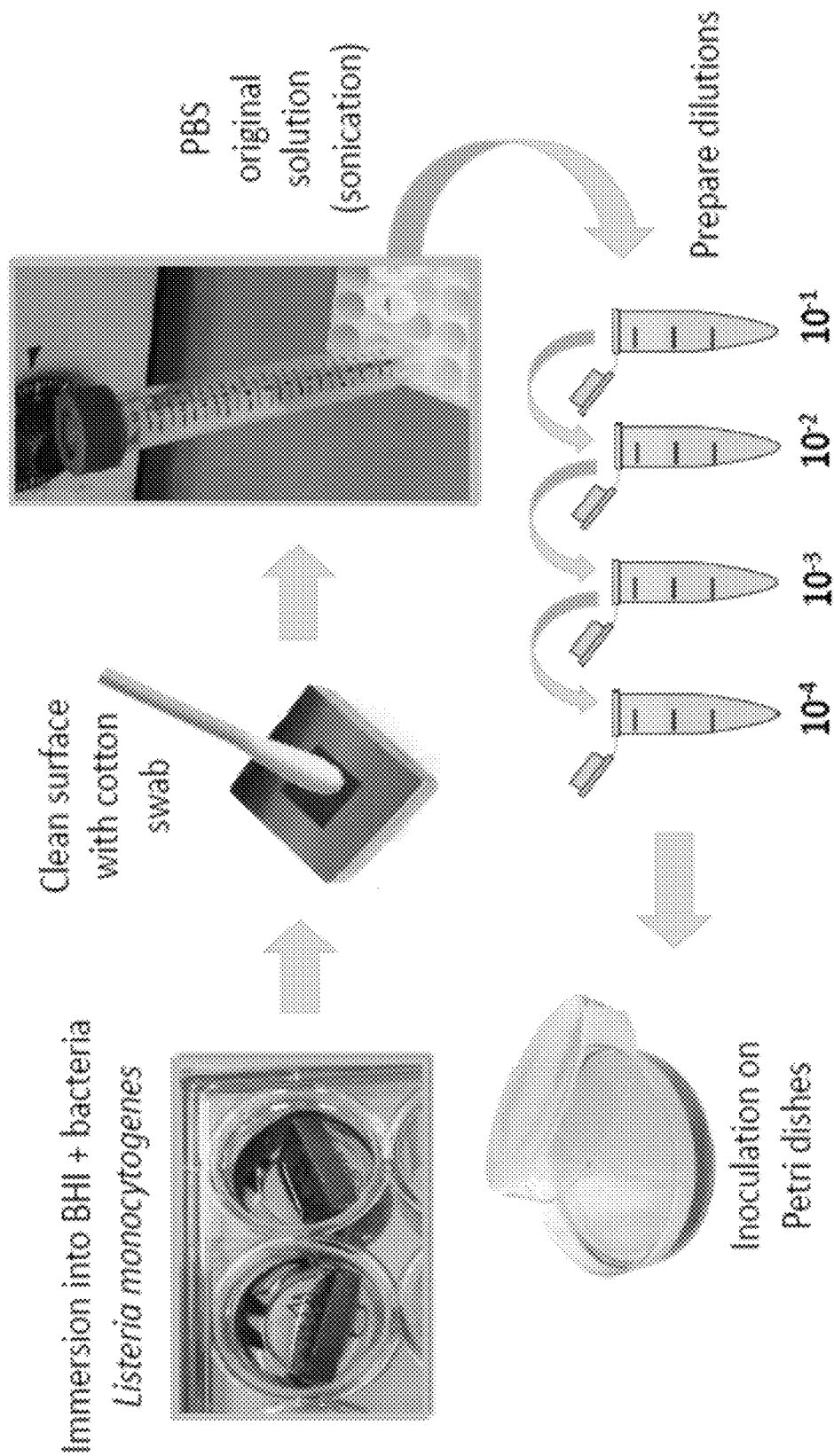
FIG. 16 shows a flow diagram showing antibacterial test. A specimen of either Titanium or stainless steel treated with different concentrations of nisin is in contact with the testing bacteria *Listeria monocytogenes*, cleaned with cotton swab and transfer any bacteria from the swab to a tube with PBS solution before any resulted bacteria is split into various concentrations to seed on the petri dish.
Figure 18:
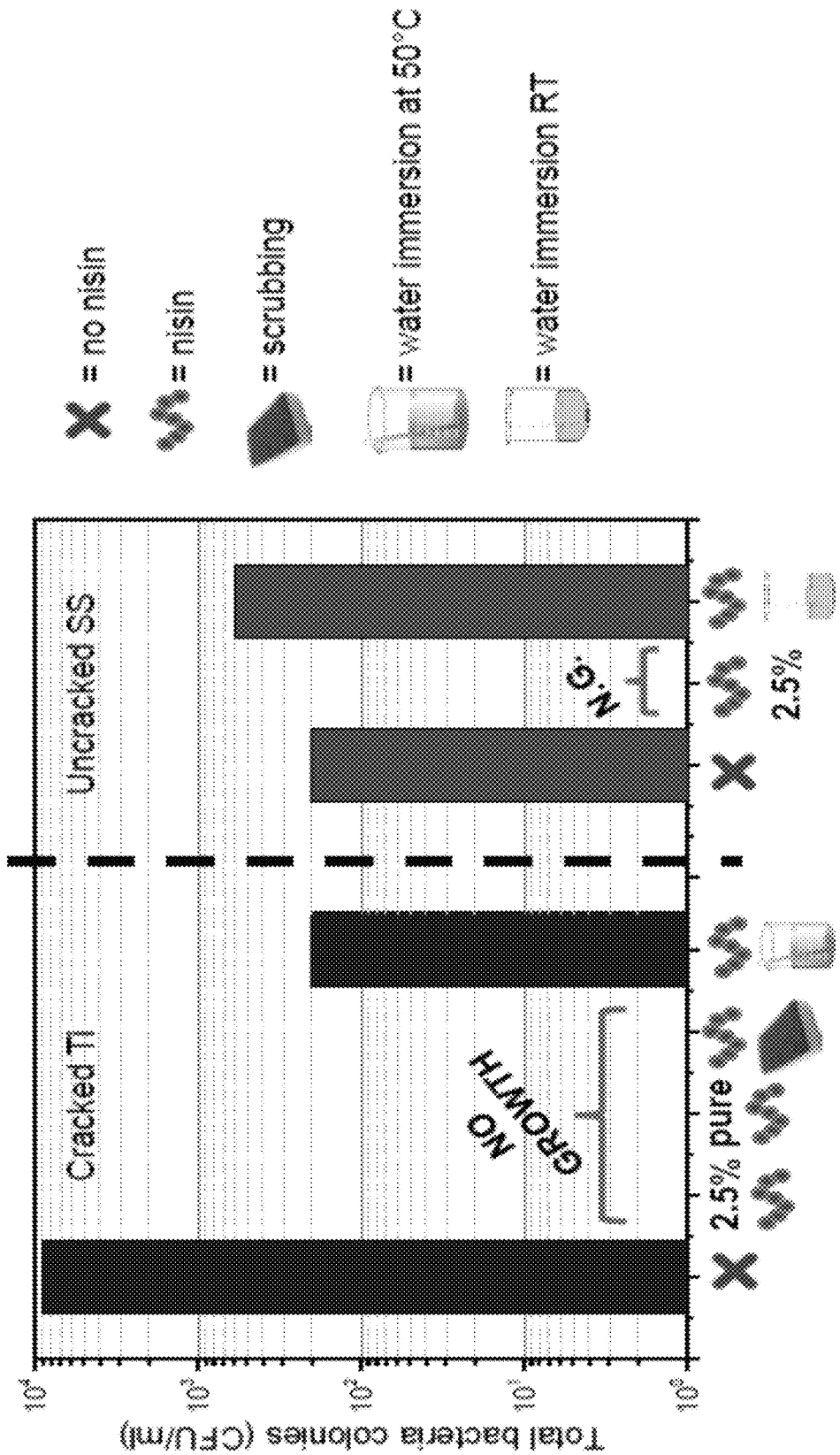
FIG. 18 shows antibacterial activity displayed by diverse treatment of either Cracked Titanium or uncracked stainless steel. The treatment include treating Cracked Titanium or uncracked stainless steel with no nisin, with pure nisin, scrubbing the nisin treated metal, water immersion nisin treated metal at room temperature or raised temperature. Results show that pure nisin or 2.5% nisin in the petri dish is sufficient to inhibit bacteria growth, whether it comes from Titanium or from stainless steel. Raised temperature helps nisin release from cracked Titanium
Tables

We have found that changing pH has an impact on nisin release in the solution. Nisin has very low solubility in alkaline conditions. Therefore, no nisin would release at pH10. It is noteworthy as shown in FIG. 15, with the stainless steel with cracks, the sample was loaded with nisin and immersed in deionized water (pH 6 and RT). After 18 days, no nisin release was detected. However, changing the same loaded specimen from normal to harsh conditions (pH 2 and 50° C.), the oxide layer underwent corrosion (spalling) in less than 24 hours. This corrosion destroyed the cracks and then nisin could be released. This is the confirmation that nisin was effectively into the cracks.

Figure 12A:
FIGS. 12A-12B show comparison of nisin-coated specimens immersion into water. The process involves generally with nisin treatment to the specimen first, then the specimen is immersed in the water at room temperature, and nisin concentration in the solution is measured by typical BCA method. Cracked titanium is shown in FIG. 12A: loaded specimens were immersed in deionized water at room temperature and pH 6 for up to 21 days, but there was not release of nisin. Later, conditions were changed by increasing the temperature of water and even changing to acidic (pH 2) and basic (pH 10) conditions, but it was not possible to confirm any nisin release. GDS or XPS could likely be good techniques to confirm if nisin remains anchored to titanium oxide surface and into the cracks. An uncracked stainless steel is shown in FIG. 12B: loaded specimen was immersed in deionized water at room temperature and pH 6. The change in color in the colorimetric test was evident from the first days and deep purple after 21 days of immersion, confirming that nisin is effectively being released from the oxidized steel surface.
Figure 12B:
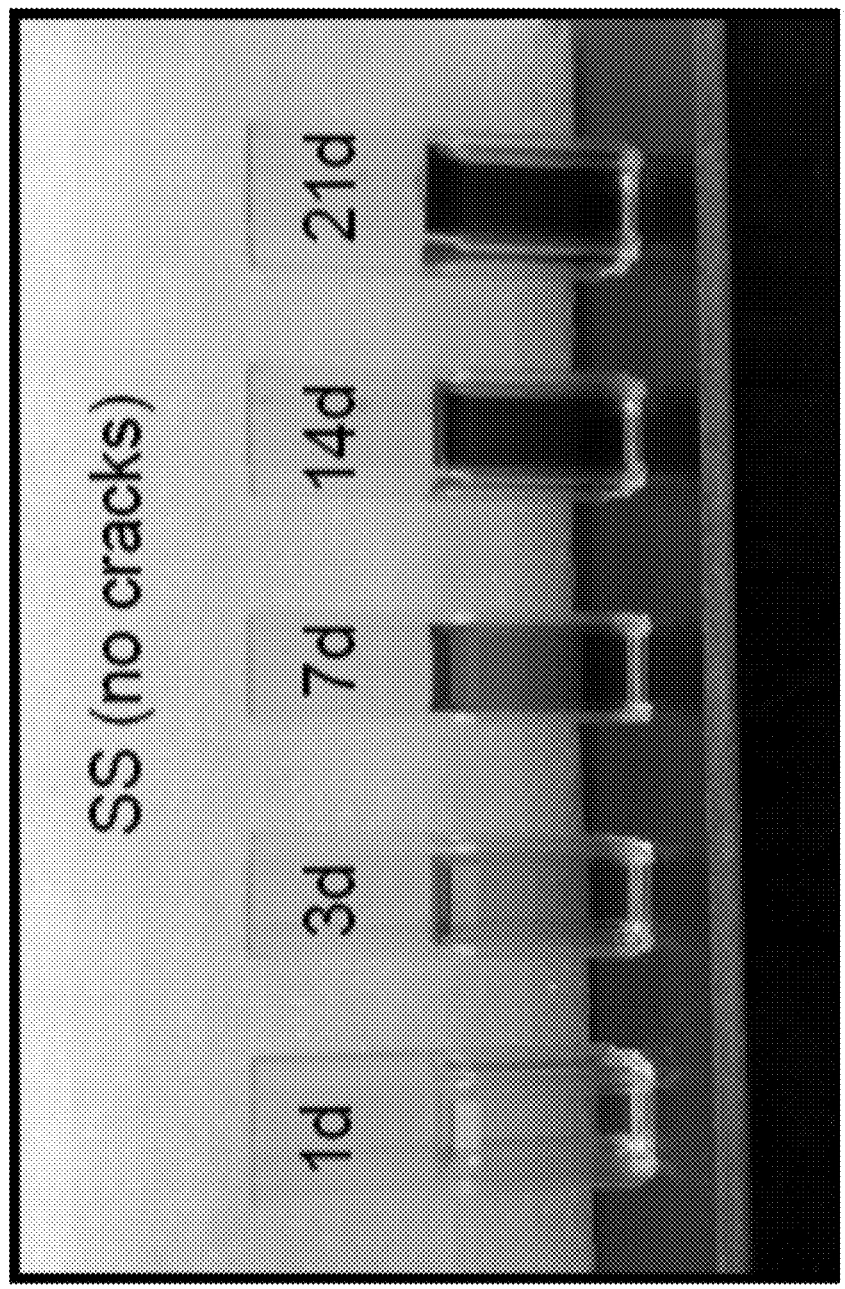
Figure 13:
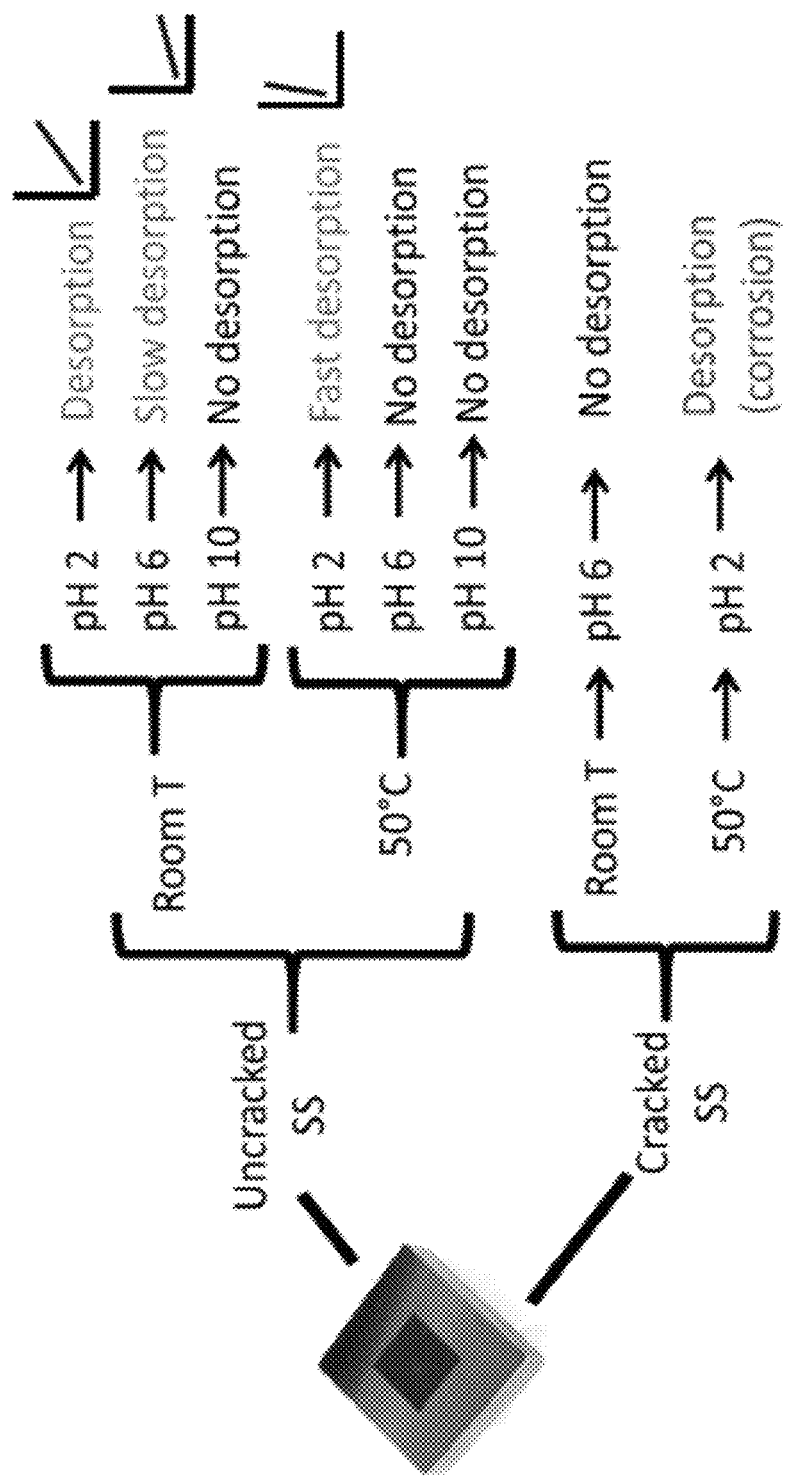
FIG. 13 depicts diagram showing the change of pH and temperature on nisin treated uncracked or cracked stainless steel undergoes different nisin release result in solution.
Figure 14B:
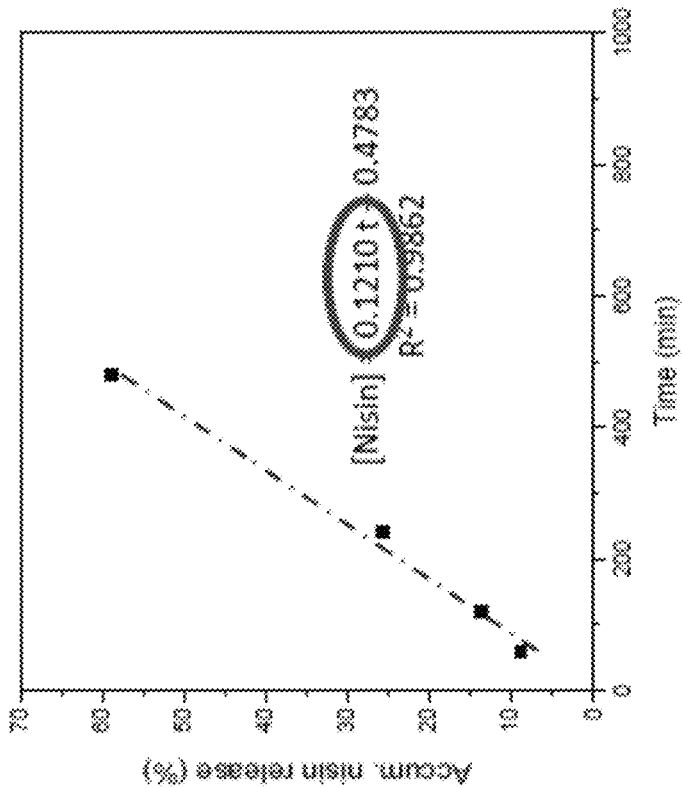
FIGS. 14A-14B shows that Nisin desorption from stainless steel shows linear behavior.
Figure 14A:
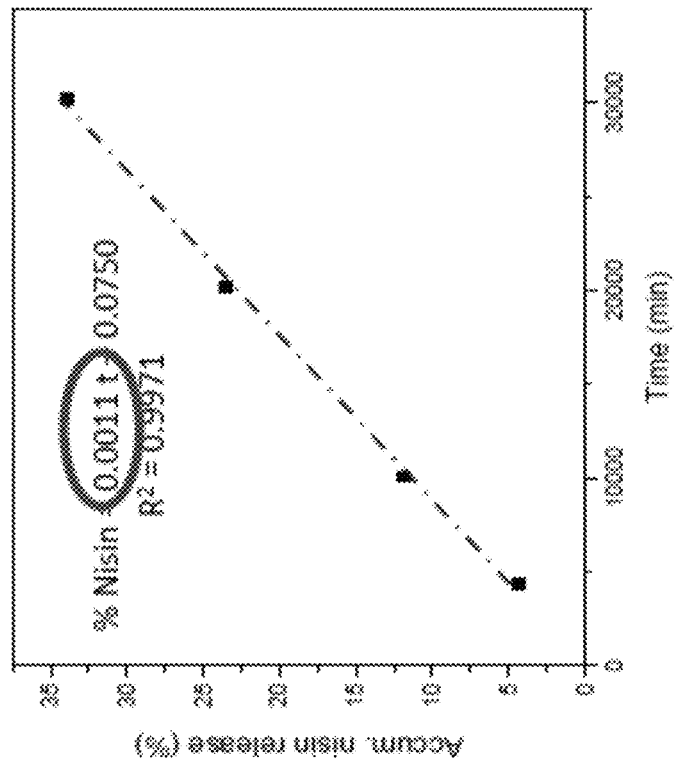

It is also noted that stainless steel releases more nisin than Titanium. As shown in FIG. 12, Titanium with cracks and stainless steel without cracks are treated with nisin first, then immersed in water at room temperature. By BCA measurement, Titanium with cracks did not release any nisin after 21 days, whereas stainless steel with no cracks has shown colorimetric reading starting from day three and peaks on day 21.

One advantage of instant disclosure is that the antibacterial material can be stored in various metal surface cracks, and such storage is easily monitored by optical observation based on the color change of the film.

EXPERIMENTAL

Five Ti-6Al-4V (henceforth Ti alloy) coupons (12×12×3 mm) with a chemical composition shown in Table I, were irradiated using an Er-doped, glass-fiber laser ($\lambda=1.54$ µm) from SPI Lasers, Inc., at 7.6 W average power, pulse frequency of 225 kHz and pulse duration of 120 ns, in air, scanning a 6×6 mm area of the sample surface, line by line, with parallel laser traces at a controlled scan velocity [11].

After laser exposure, the irradiated (colored) area of the coupons was characterized by scanning electron microscopy (SEM) combined with focused ion beam (FIB) machining, using a FEI Nova 200 NanoLab DualBeam™-SEM/FIB. SEM images were helpful to perform measurements of crack density and crack spacing, while FIB cuttings were used to observe the cross section of the Ti alloy, estimate the oxide thickness and crack depth into the film.

Results

Ti alloy coupons were superficially melted by the laser promoting oxygen diffusion through the molten material and, thus, to the oxidation of the Ti alloy [11]. These oxide layers (henceforth the oxide film) vary in color depending on the oxide thickness as shown in Table II.

Oxide Film

The oxides produced by laser irradiation are composed of TiO and $Ti_6O$. The latter is mainly present in the interfacial layer, essentially intercalated in the HCP α-Ti substrate [4]. The film thickness, determined using images of the cross sections, is on the order of 100-150 nm, depending on the applied scan speed (Table II).

Figures 1A, 1B:
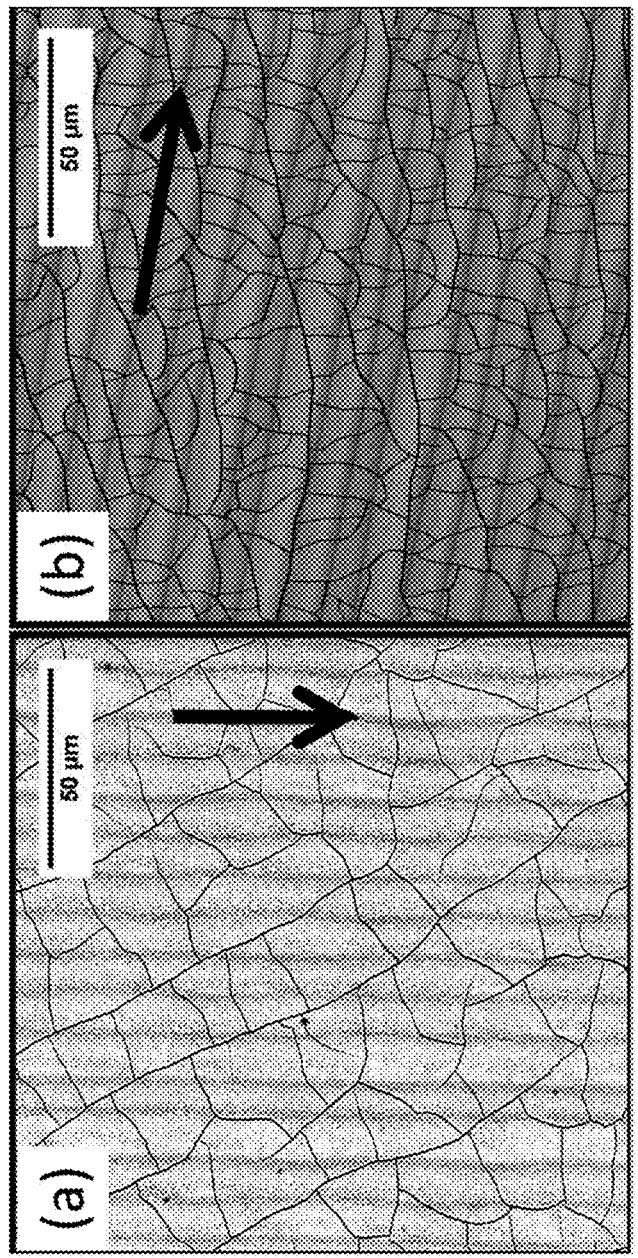

A collection of interconnected cracks, resulting in the formation of oxide islands, covers the surface. This mudflat cracking (FIGS. 1A-1B) indicates the oxide film is stress relieved; residual stresses that developed during fabrication, likely due to difference in coefficients of thermal expansion between oxide and substrate, have been relieved through cracking. The average island diameter, or spacing between cracks, determined from line averages of SEM images, is on the order of 5-14 µm, and it decreases when the film thickness (h) decreases (Table III).

Substrate

FIB images of the cross section revealed that the cracks present in the film penetrate into the substrate (Ti alloy). The penetration is significant, mostly on the order of 1-6 µm beneath/below the interface.

Figures 2A, 2B:
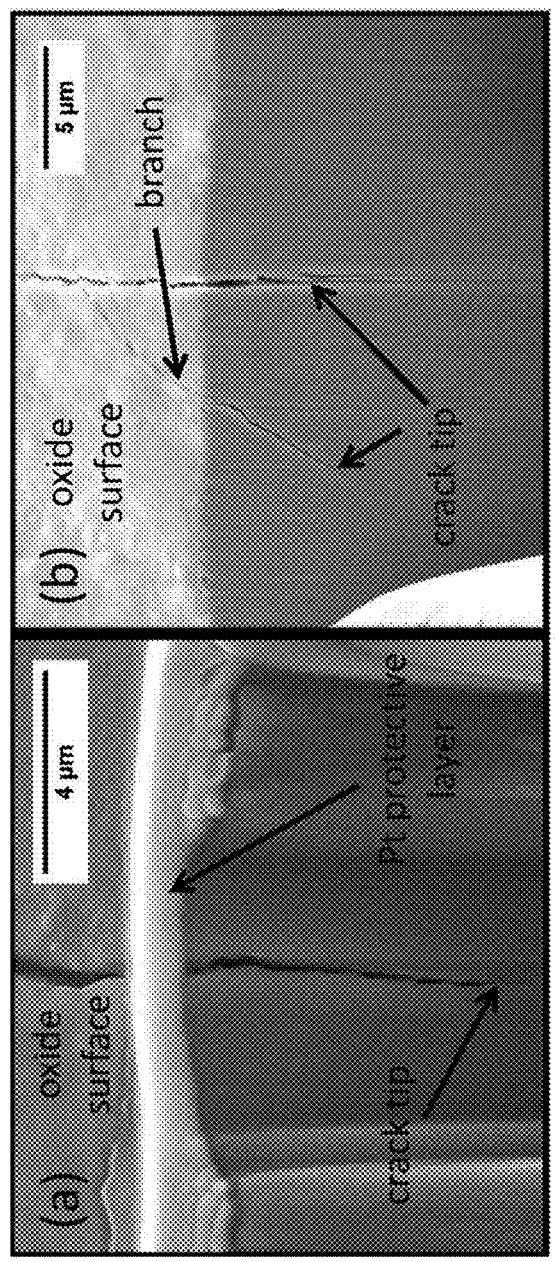

For all five Ti alloy coupons, cracks mostly grow perpendicular to the surface, with a few variations like the branch shown in FIG. 2B. No evidence of significant bifurcation within the substrate was observed, nor was there any evidence that the crack directions were altered significantly at the oxide-metal interface.

Crack formation in materials is controlled by (a) the mechanical properties, including modulus (stiffness), toughness (energy required to break the material), and thermal expansion, (b) the geometrical properties (dimensions and flaw population), and (c) the loading (applied and residual strain, and temperature excursions) [12].

Mechanics of the Film

Every time that the native oxide layer is irradiated by a laser pulse, the local thermal excursion leads to the generation of local stresses and strains. The irradiation generates a change in temperature which drives to an expansion of the whole system (film+substrate), but film and substrate expand at different rates because the coefficient of thermal expansion of the film is different to that of the substrate. When a thin film is deposited on a substrate, a composite is formed in which the presence of the substrate affects the film and vice versa [13].

After the few nanoseconds of irradiation, the whole system cools down. Film and substrate contract but, again, they do it at different rates. In the particular case of this study, the oxide film must have a higher coefficient of thermal expansion than the substrate; this way, the film contracts faster than the substrate but, because the substrate is substantially thicker than the film, even if the latter tends to shrink, the former restricts it from doing so, and thus the film experiences a tensile residual stress ($\sigma_0$) that can be relieved by film cracking. However, at the same time, the interaction with laser promotes specific chemical reactions that change the chemistry in the oxide film; more oxygen (and probably other chemical species) diffuse into the film, creating a mixture of different oxides (TiO, $Ti_6O$) and a thicker film. Because the chemical composition of the oxide layer is different depending on the thickness of the film, it is assumed that the fracture toughness of the film ($\Gamma_r$) is not of the same magnitude for all the samples.

The first cracks appear with uniform spacing and only when the stress in the film reaches a critical value. Once the first cracks are formed, the distribution of stress transferred across the interface that causes more fracture is different from that which originally existed when the film was continuous [13]. The cracking produces a stress relaxation in the film that lowers the stress to a value below that of the critical stress, especially in the regions very close to the crack. As the substrate is strained further, the stress in the cracked oxide segments (islands) will increase and, to relieve this added stress, more cracks will form, generally in the midpoints of the unbroken islands, those points being the farthest from the cracks and thus experiencing the least stress relaxation (maximum stress) [13]. In the case of this study, the process may be repeated several times with a laser pulse irradiating the surface every few nanoseconds. We begin with the assumption that the film would not have undergone multiple fracture (mudflat) if it were not bonded to a more pliable material as substrate beneath it [13].

Once the laser irradiation process has been completed, crack density (C) in the oxide film may be estimated using SEM images. Then the average spacing between cracks can be calculated with the equation:

$$S = \frac{1}{C} \quad \text{(Eq. 1)}$$

where S is the crack spacing. Values of crack density and crack spacing for each one of the samples are shown in Table III.

With the application of nanoindentation, Lawrence [4] determined that residual stresses in oxide films grown using similar laser scan rates are in the order of 6.7 to 10.3 GPa. Using this data and $$\sigma_0 = \frac{E_f \varepsilon_0}{(1 - v_f)} \quad \text{(Eq. 2)}$$

the applied strain in the film ($\varepsilon_0$) may be calculated. With the parameters in Table IV, $\varepsilon_0$ is estimated in the 0.022-0.034 range. $E_f$ and $v_f$ are the Young's modulus and the Poisson's ratio of the film, respectively.

According to Thouless [14], the crack spacing is proportional to the square root of the film thickness by $$S \simeq 5.6h \sqrt{\frac{\Gamma_f (1 - v_f)}{(1 + v_f) E_f \varepsilon_0^2 h}} \quad \text{(Eq. 3)}$$

where $\Gamma_f$ is the fracture toughness of the film (in J/m²).

Using Eq. 3, it is estimated that $\Gamma_f$ should be between 4600 J/m² and 7500 J/m².

Mechanics of the Substrate

Channel cracks in the film have developed at some stage during the cooling of the film/substrate system and their growth may be stopped either because the substrate is much tougher or because sufficiently large substrate surface defects are not readily available [15]. Hu et al. [16] demonstrated that Cr films subject to tensile intrinsic stress first split generating a mudflat cracking pattern, and then the cracks subsequently can extend into glass substrates, growing along the plane for which $K_{II}$=0. Guo et al. [17] also found that cracks penetrate into the substrate when a brittle TiN film is placed on brass substrate.

In this current study, the film is stiffer than the substrate ($E_f > E_s$). A compliant substrate provides less constraint for crack propagation [8]. Because the laser pulses are directly applied to the oxide film, the stress and strain reside in the film, not in the substrate. The available driving force ($G_a$) decays significantly for deep cracks, implying stable propagation. The crack arrests at a certain depth due to this decline.

Since cracks can propagate in a stable fashion below the film-substrate interface when they are driven by a residual tension in the film [18], the energy-release rate (driving force) at the tip of a single crack of depth a, where a>>h, tends to a limit of $$\frac{G_a}{\overline{E}_s h \varepsilon_0^2} = 2.14 \left( \frac{1 + \alpha}{1 - \alpha} \right) \left( \frac{a}{h} \right)^{-1} \quad \text{(Eq. 4)}$$

where $\overline{E}_s$ is the Young's modulus of the substrate and $\alpha$ is the Dundurs' parameter, $$\alpha = \frac{\overline{E}_f - \overline{E}_s}{\overline{E}_f + \overline{E}_s} \quad \text{(Eq. 5)}$$

where $\overline{E} = E/(1-v^2)$ in plane strain. If $\alpha$ is positive, means that the film is stiffer than the substrate; if negative, then substrate is stiffer than the film.

Figure 3:
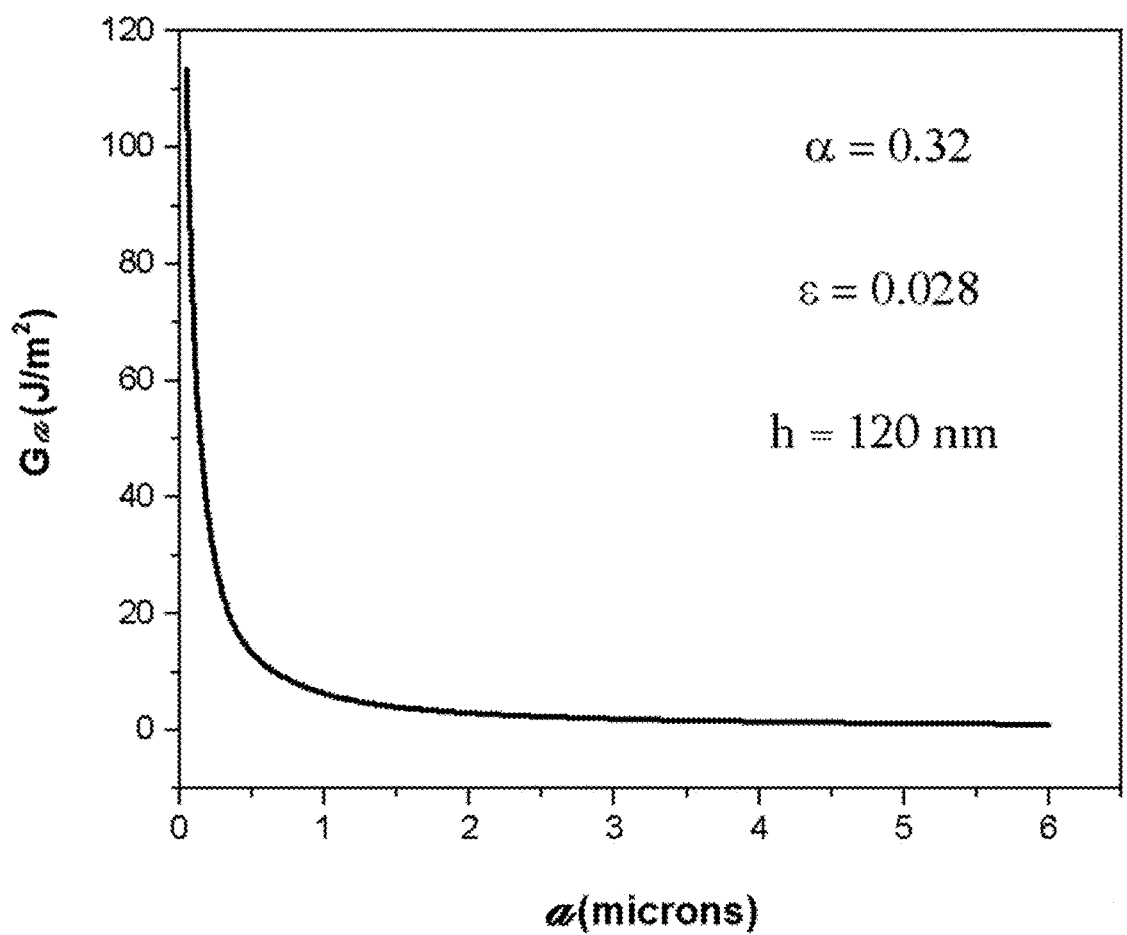
FIG. 3 shows decay of available driving force with increasing crack depth.

For the film/substrate system in this study, $\alpha$=0.32, while $G_a$ depends on the crack depth according to FIG. 3. It can be observed that the decay is very significant in the first 500 nm, therefore there is enough driving force to cross the interface and penetrate into the substrate.

Drory and Evans [19] determined that for a semi-infinite substrate, the opening mode stress intensity factor $K_I$ for a line force on a crack surface is given by $$\frac{K_I}{\sigma_0 \sqrt{h}} = \frac{2.6}{\sqrt{\pi \lambda}} \quad \text{(Eq. 6)}$$

where $\lambda$ is the relative depth and is defined as $\lambda$=(a−h)/h. So, $K_I$ is inversely proportional to the square root of the relative depth as shown in FIG. 6 from [19] for $\lambda$ up to 10.

Figure 4:
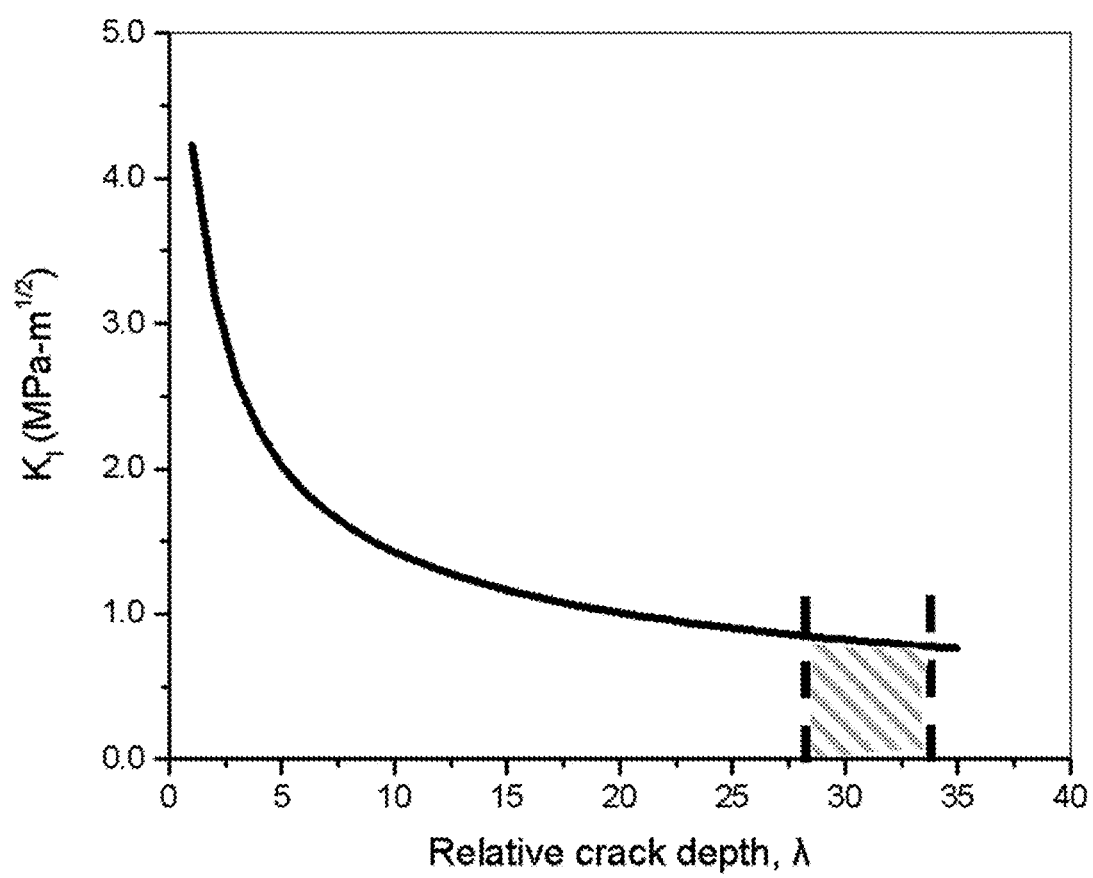
FIG. 4 shows variation in stress intensity factor vs relative crack depth (penetrating into the substrate). Shaded area represents the relative crack depth for the films used in this study.

In this study, the average crack depth is around 30-35 times larger than the film thickness, and the behavior of $K_I$ vs $\lambda$ is shown in FIG. 4. It is important to remark that the $K_I$ values of the Ti alloy are in the order of 1 MPa√m. This value is considerably lower than the average fracture toughness for Ti-6Al-4V, which is on the order of 65 MPa√m [20].

This low toughness is likely due to embrittlement of the substrate from either oxygen or hydrogen. As the laser irradiates the film, a flaw is activated and the cracks grow towards the interface but, at the same time, several chemical reactions occur; the main one is the diffusion of oxygen that enriches the film, creating a mixture of oxides. As the growth is in ambient atmosphere both oxygen and water vapor are present, and the harsh environment of the pulsed laser could lead to dissociation of water, making possible either embrittling species could be present. Literature reports of O embrittling α-Ti [21] or H embrittling Ti [22, 23] originating the decay in $K_I$. Unfortunately, given the rapid diffusion of H in Ti, the time between fabrication and analysis would be prohibitive to identify if H had been the embrittling species; similarly the fact that the oxide intermixes with the matrix makes identifying the actual concentration near the end of the crack tip challenging.

Therefore, the application of PLI on Ti-6Al-4V alloy specimens creates an oxide film composed by a mixture of different Ti oxides with 100-150 nm thickness; strong presence of mudflat cracking is observed, with cracks that not only penetrate the film but also the substrate, attaining depths estimated at 1-6 μm.

Given that the oxide film is stiffer than the substrate and α>0, the energy release rate in the film increases when the ratio a/h increases, which helps the cracks reach the interface.

When cracks start to penetrate into the substrate, the energy release rate (driving force) considerably decays because the stress forms in the film. At some depth, the energy is not enough to continue the fracture of the substrate, and the cracks arrest.

The toughness at which cracks arrest in this system (on the order of 1 MPa√m) is significantly lower than the bulk toughness of Ti-6Al-4V; this may be due to embrittlement caused by the diffusion of chemical species (e.g. hydrogen or oxygen) during oxide growth due to the interaction between the laser pulse and the atmosphere.

We have shown that a mudflat cracked oxide layer may be created on the surface of Ti-6Al-4V by irradiation with a pulsed laser. These cracks penetrate 2-6 μm into the substrate, and can be used as reservoir for second-phase compounds like antimicrobial agents.

FTIR spectra show that, even after mechanical and environmental impacts, some amine/amide groups are still on the surface of the treated oxide.

Antibacterial tests show that, even after mechanical impact (scrubbing), the oxide surface treated with nisin still shows antibacterial properties.

REFERENCES

[1] Nam, K., I. Park & S. Ko. Patterning by controlled cracking. Nature, 485, 221-224 (2012).
[2] Mani, S. & T. Saif. Mechanism of controlled crack formation in thin-film dielectrics. Applied Physics Letters, 86, 201903(1-3) (2005).
[3] Seghir, R. & S. Arscott. Controlled mud-crack patterning and self-organized cracking of polydimethylsiloxane elastomer surfaces. Scientific Reports, 5:14787, DOI 10.1038/srep14787 (2015).
[4] Lawrence, S., D. Adams, D. Bahr & N. Moody. Deformation and fracture of a mudflat-cracked laser-fabricated oxide on Ti. Journal of Materials Science, 48, 4050-4058 (2013).
[5] Lim, Y., Y. Sohida, C. Andres & M. Barco. Surface characterizations of variously treated titanium materials. The International Journal of Oral & Maxillofacial Implants, 16, 333-342 (2001).
[6] Tarasenko, V., S. Alekseev, A. Fedenev, I. Goncharenko, N. Koval, K. Oskomov, V. Orlovskii, N. Sochugov & M. Shulepov. Study on IR and UV—lasers interaction with metal surfaces. Gas and Chemical Lasers and Intense Beam Applications III, 4631, 234-243 (2002).
[7] Akman, E. & E. Cerkezoglu. Compositional and microscratch analyses of laser induced colored surface of titanium. Optics and Lasers in Engineering, 84, 37-43 (2016).
[8] Hutchinson, J. & Z. Suo. Mixed mode cracking in layered materials. Advances in Applied Mechanics, 29, 63-146 (1992).
[9] Xia, Z. & J. Hutchinson. Crack patterns in thin films. Journal of the Mechanics and Physics of Solids, 48, 1107-1131 (2000).
[10] Guo, T., L. Qiao, X. Pang & A. Volinsky. Brittle film-induced cracking of ductile substrates. Acta Materialia, 99, 273-280 (2015).
[11] Pérez del Pino, A., P. Serra & J. Morenza. Oxidation of titanium through Nd:YAG laser irradiation. Applied Surface Science, 197-198, 887-890 (2002).
[12] Choul-Kim, B., C. Moraes, J. Juang, M. Thouless & S. Takayama. Fracture-based micro- and nanofabrication for biological applications. Biomaterials Science, 2, 288-296 (2014).
[13] Wojciechowski, P. & M. Mendolia. Fracture and cracking phenomena in thin films adhering to high-elongation substrates. Thin Films for Emerging Applications (Edited by M. Francombe & J. Vossen), Academic Press Inc., 16, 271-282 (1992).
[14] Thouless, M. Modeling the development and relaxation of stresses in films. Annual Review of Materials Science, 25, 69-96 (1995).
[15] Zhou, J., S. Huang, L. Zuo, X. Meng, J. Sheng, Q. Tian, Y. Han & W. Zhu. Effects of laser peening on residual stresses and fatigue crack growth properties of Ti-6Al-4V titanium alloy. Optics and Lasers in Engineering, 52, 189-194 (2014).
[16] Hu, M., M. Thouless & A. Evans. The decohesion of thin films from brittle substrates. Acta Metallurgica, 36, 1301-1307 (1988).
[17] Guo, T., L. Qiao, X. Pang & A. Volinsky. Brittle film-induced cracking of ductile substrates. Acta Materialia, 99, 273-280 (2015).
[18] Thouless, M., Z. Li, N. Douville & S. Takayama. Periodic cracking of films supported on compliant substrates. Journal of Mechanics and Physics of Solids, 59, 1927-1937 (2011).
[19] Drory, M. & A. Evans. Experimental observations of substrate fracture caused by residually stressed films. Journal of American Ceramic Society, 73, 634-638 (1990).
[20] Niinomi, M. Mechanical properties of biomedical titanium alloys. Materials Science and Engineering A, A243, 231-236 (1998).
[21] Liu, Z. & G. Welsch. Effects of oxygen and heat treatment on the mechanical properties of alpha and beta titanium alloys. Metallurgical Transactions A., 19A, 527-542 (1988).
[22] Meyn, D. Effect of hydrogen on fracture and inert-environment sustained load cracking resistance of α-β titanium alloys. Metallurgical Transactions, 5, 2405-2414 (1974).
[23] Tal-Gutelmacher, E. & D. Eliezer. Hydrogen-assisted degradation of titanium based alloys. Materials Transactions, 45, 1594-1600 (2004).

The invention claimed is:

1. An antibacterial metal surface comprising an oxide layer with cracks created by a pulse laser irradiation (PLI) and an effective amount of an antimicrobial compound, wherein said cracks penetrated through the oxide layer and into the metal surface are filled with an effective amount of said antimicrobial compound, wherein said antimicrobial compound is nisin.

2. The antibacterial metal surface according to claim 1, wherein the oxide layer varies in thickness and displays different colors due to interaction with a visible light.

3. The antibacterial metal surface according to claim 1, wherein the metal is titanium or an alloy thereof.

4. The antibacterial metal surface according to claim 1, wherein the metal is a stainless steel.

5. The antibacterial metal surface according to claim 1, wherein the metal surface is a food processing knife, cutting board, packaging utensil, or surgical scalpel.

6. A method of providing antibacterial functionalities to a metal surface comprising: modifying the metal surface with pulse laser irradiation to create an oxide layer, with various depths of cracks generated by said puke laser irradiation, wherein said cracks penetrate through the oxide layer and into the metal surface; saturating said cracks in the oxide layer with effective amount of an antimicrobial compound; and optionally washing or scrubbing the oxide layer to remove extra said antimicrobial compound, wherein said antimicrobial compound is nisin.

7. The method according to claim 6, wherein said metal is titanium or an alloy thereof.

8. The method according to claim 6, wherein the metal is a stainless steel.

9. The method according to claim 6, wherein the metal surface is a food processing knife, cutting hoard, packaging utensil, or surgical scalpel.

* * * * *